United States Patent Office 3,794,623
Patented Feb. 26, 1974

3,794,623
PERFLUOROALKYL GROUP CONTAINING α,β-UNSATURATED DI- AND TRIESTERS AND POLYMERS THEREOF
Eduard Karl Kleiner, New York, and Martin Knell, Ossining, N.Y., assignors to Ciba-Geigy Corporation, Ardsley, N.Y.
No Drawing. Continuation-in-part of application Ser. No. 720,370, Apr. 10, 1968. This application Nov. 17, 1971, Ser. No. 199,794
Int. Cl. C08f 3/70, 15/16
U.S. Cl. 260—78.4 E                      26 Claims

ABSTRACT OF THE DISCLOSURE

Perfluoroalkyl group containing esters of α,β-unsaturated di- and triesters and polymers thereof are disclosed. The polymers have soil repellent properties particularly if applied to substrates such as textile paper, leather and the like. The esters are derived from ether and/or carbon-carbon double bond containing perfluoroalcohols or mercaptans and α,β-unsaturated di- or triacids.

RELATED APPLICATION

This application is a continuation-in-part of copending application Ser. No. 720,370, filed Apr. 10, 1968.

SUMMARY OF THE INVENTION

This invention is directed to novel monomers and polymers which can be prepared from them. The disclosed polymers possess low free surface energies and therefore soil repellent properties as evidenced by their oil and water repellency. The polymers are useful especially as coatings for a wide variety of substrates including textiles, paper, leather, painted wood and metallic surface and the like.

The novel monomeric compounds are α,β-unsaturated di- and triesters of the following formula:

(I)

wherein $R^1$, $R^2$, $R^3$ are hydrogen, methyl, $R_fA$— or $R_fACH_2$— with the proviso that at least one or two of the R-substituents represent $R_fA$— or $R_fACH_2$—;

$R_fA$ is

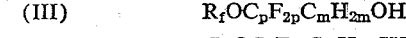
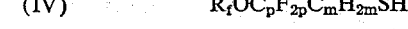
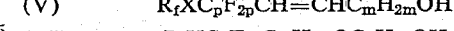
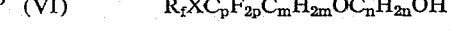
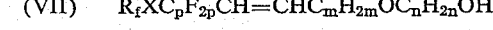

$R_f$ is $C_qF_{2q+1}$, wherein $q$ is 3 to 18 and preferably 6 to 12;

$m$ is 1 to 12 and preferably 2, 3 or 4;

$n$ is 2 to 12 and preferably 2, 3 or 4;

$p$ is 2 to 6 or zero;

$X$ is oxygen or zero if $p$ is zero.

In the disclosed α,β-unsaturated di- and triesters, the $R_fA$ group will contain at least one ether or one carbon-carbon double dond or a combination of ether and carbon-carbon double bond linkages. From structure I, it is apparent the ether linkage if present may be in the perfluorinated segment ($R_fOC_pF_{2p}$) or in the nonfluorinated segment ($—C_mH_{2m}OC_nH_{2n}—$ or $—CH=CHC_mH_{2m}OC_nH_{2n}—$).

If $R^1$, $R^2$ and $R^3$ represent the substituents as defined above, structure I represents the following esters:

| Type ester | $R^1$ | $R^2$ | $R^3$ |
|---|---|---|---|
| Fumarate | —H | —AR$_f$ | —H |
| Maleate | —AR$_f$ | —H | —H |
| Mesaconate | —H | —AR$_f$ | —CH$_3$ |
| Citraconate | —AR$_f$ | —H | —CH$_3$ |
| Itaconate | —H | —H | —CH$_2$AR$_f$ |
| Methylene malonate | —H | —H | —AR$_f$ |
| cis-Aconitate | —H | —AR$_f$ | —CH$_2$AR$_f$ |
| trans-Aconitate | —AR$_f$ | —H | —CH$_2$AR$_f$ |

If monomers of type I are homo- or copolymerized, polymers are obtained containing the following repeating units or moieties:

(II)

wherein $R_fA$, $R^1$, $R^2$, $R^3$ are as defined above.

DETAILED DESCRIPTION OF THE INVENTION

Several alternate techniques exist for the preparation of the α,β-di- and triesters of the formula:

(I)

wherein $R_fA$, $R^1$, $R^2$ and $R^3$ have been previously defined.

The perfluoroalkyl ($R_fA$) monomers of type I can be derived from $R_f$ alcohols or $R_f$ mercaptans of the type:

(III)      $R_fOC_pF_{2p}C_mH_{2m}OH$ (IV)      $R_fOC_pF_{2p}C_mH_{2m}SH$ (V)       $R_fXC_pF_{2p}CH=CHC_mH_{2m}OH$ (VI)      $R_fXC_pF_{2p}C_mH_{2m}OC_nH_{2n}OH$ (VII)     $R_fXC_pF_{2p}CH=CHC_mH_{2m}OC_nH_{2n}OH$ and fumaric, maleic, mesaconic, citraconic, itaconic, methylene malonic, aconitic (cis and trans) acids as well as the acid chlorides or acid anhydrides, if obtainable, or esters of these acids. In the above alcohols and mercaptans, $R_f$, X, $p$, $m$ and $n$ maintain the definition found in conjunction with the novel monomer of Formula I.

As has been mentioned the novel monomers of Formula I are obtained from the alcohols and mercaptans of types III to VII and the listed acid, acid chlorides, acid anhydrides or esters of these acids. Well-known esterification or transesterification procedures may be employed. Since many of the acids have high melting points or poor solubility characteristics, it usually is preferable to employ the acid chlorides, anhydrides or lower alkyl esters of the listed acids. It is also possible and often advantageous to employ lower alkyl esters of the $R_f$ alcohols of types III and V to VII for transesterification reactions instead of the alcohol itself.

Another alternative synthesis for the monomers of Formula I where $R_fA$ is (I) 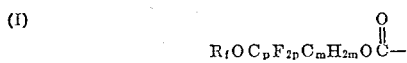

is the reaction of a perfluoroalkyl iodide, (VIII) $\quad R_fOC_pF_{2p}C_mH_{2m}I$ with a salt of fumaric, maleic, mesaconic, citraconic, itaconic, methylene malonic and aconitic acid.

For the purposes of illustration, the following equations demonstrate reactions which are employed to make the monomers of the present invention from the disclosed $R_f$ alcohols, mercaptans and lower alkyl esters of these alcohols:

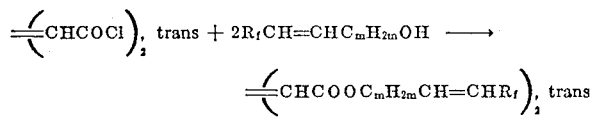

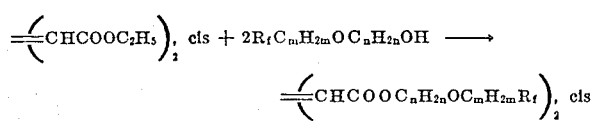

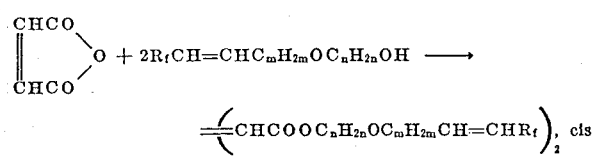

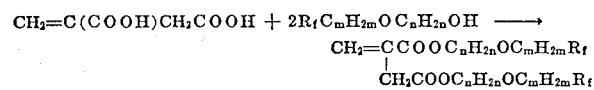

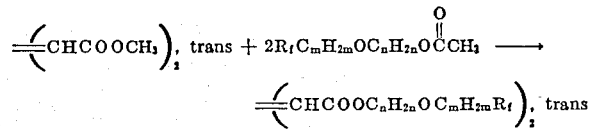

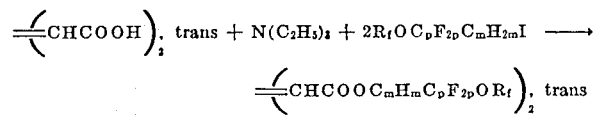

A detailed disclosure for the starting $R_f$ alcohols, esters of these alcohols, $R_f$-mercaptans and $R_f$ iodides of types III through VIII exists in the following patents:

Alcohols IV, U.S. 3,088,849; V, U.S. 3,285,975; III, U.S. 3,293,306; Italian Pat. 804,233; German Offen. 1,915,-609; French Pat. 1,574,801.

Reference is made to these teachings for suitable starting compounds useful for preparation of the novel monomers of type I disclosed herein.

From the standpoint of illustration, several different classes of reactions are provided to demonstrate the preparation of the starting compounds of types III to VII which are useful to form the novel perfluoroalkyl α,β-unsaturated di- and triesters of Formula I:

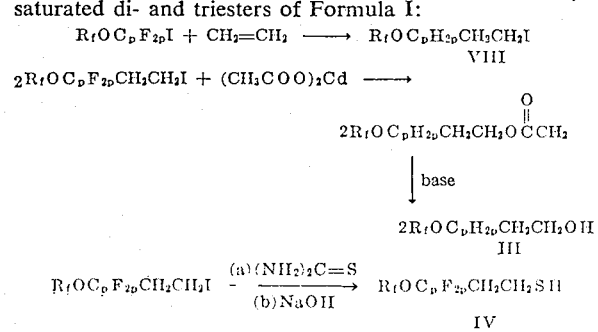

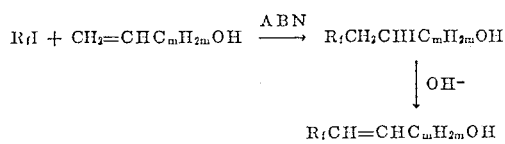

or

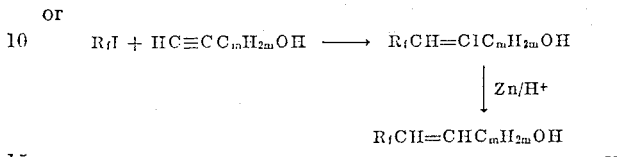

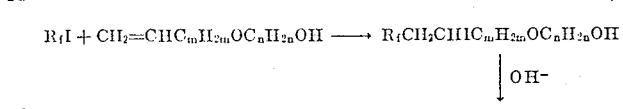

or

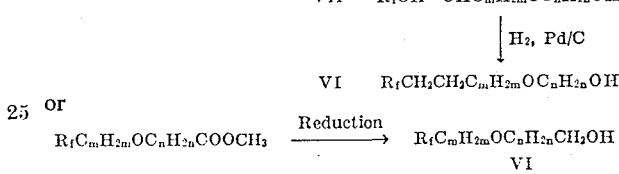

The perfluoroalkyl containing esters of type I are useful in the preparation of polymers of type II. These polymers are characterized by the fact that each monomer moiety in the polymer chain contains a close packed pair or triplet of $R_f$-groups in contrast to the analogous $R_f$-acrylate or methacrylate polymers which contain just one $R_f$-group per monomer moiety as the following examples demonstrate:

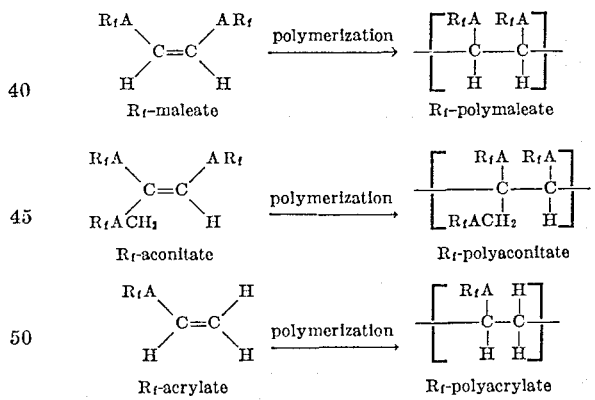

The polymers containing this closeness of spacing or packing of the $R_f$ group have been found to possess lower free surface energies over analogous $R_f$ acrylate or methacrylate polymers which contain only one $R_f$ group per monomer moiety.

Monomers of type II of the present disclosure can be utilized for the synthesis of graft polymers due to the fact that these monomers show a reduced tendency to homopolymerize but an increased tendency toward grafting reactions in comparison to analogous $R_f$ acrylates and methacrylates.

Generally polymerization may be by bulk, solution, suspension or emulsion techniques. Solution and emulsion procedures are preferred.

In emulsion polymerization, the monomer or monomers to be polymerized are emulsifide together in a water solution of a surface active agent to a given monomer concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic and nonionic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly (ethoxy) group and the hydrophobic portion is either a hydrocarbon or a fluorocarbon group such as the ethylene oxide condensates of alkyl phenols, alkanols, alkylamines, alkyl thiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 20° to 90° C. The polymerization is generally most conveniently and preferably carried out at atmospheric pressure wherever possible.

In solution polymerization, the monomer or monomers are dissolved in a suitable solvent such as fluorinated solvents, for example, hexafluoroxylene, trifluorotoluene or mixtures thereof with acetone and/or ethylacetate and polymerized in a reaction vessel using initiators such as azobisisobutyronitrile or other azo initiators at concentrations of 0.1% to 2.0% at 40–100° C. under nitrogen.

As mentioned, besides homopolymers, valuable copolymers are obtained by polymerization of the foregoing novel perfluorinated monomers with other polymerizable monomers having ethylene unsaturation.

Examples of suitable comonomers are alkyl vinylethers, such as methyl vinyl ether, isopropyl vinyl ether, isobutyl vinyl ether, 2-methoxy ethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methyl-heptyl vinyl ether, n-decyl vinyl ether, n-tetradecyl vinyl ether, and n-octadecyl vinyl ether.

Propylene, butylene and isobutylene are preferred $\alpha$-olefins useful as comonomers with the novel fluoro monomers of the present invention. Straight and branched chain $\alpha$-olefins are useful with up to 18 carbon atoms in the side chain.

Useful copolymers of the novel perfluorinated compounds of the invention are formed with vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate.

Also useful as comonomers are styrene and related monomers which copolymerize readily with the novel esters of this invention such as o-methylstyrene, p-methylstyrene, 3,4-dimethyl styrene, 2,4,6-trimethyl styrene, m-ethyl styrene, 2,5-diethyl styrene.

Additional useful comonomers are ethylene and chlorofluoro- and cyano-derivatives of ethylene such as vinyl chloride, vinyidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 12 or 18 carbon atoms in the ester groups such as n-propyl methacrylate, 2-methyl cyclohexyl methacrylate, methyl methacrylate, t-butyl methacrylate, n-butyl methacrylate, methyl acrylate, ethyl acrylate, propyl acrylate, butyl acrylate, butyl acrylate, 3-methyl-1-pentyl acrylate, octyl acrylate, tetradecyl acrylate, s-butyl acrylate, 2-ethylhexyl acrylate, 2 - methoxyethyl acrylate, and phenyl acrylate; dienes particularly 1,3-butadiene, isoprene, and chloroprene, 2 - fluoro - butadiene, 1,1,3 - trifluoro - butadiene, 1,1,2,3 - tetrafluoro butadiene, 1,1,2 - trifluoro - 3,4-dichlorobutadiene and tri- and pentafluoro butadiene and isoprene; nitrogen-vinyl monomers such as vinyl pyridine, N-vinylimides, vinyl succinimide, vinyl pyrolidone, N-vinyl carbazole and the like.

Also useful as comonomers with some of the novel monomers of the present invention are vinyl monomers which contain perfluorinated side chains. Examples of such perfluorinated monomers are vinyl ethers of the type disclosed in U.S. 2,732,370 and U.S. 2,828,025; vinyl esters containing fluorinated alkyl groups disclosed in U.S. 2,592,069 and U.S. 2,436,144. Other useful monomers are acrylates and methacrylates and derivatives thereof such as those disclosed in U.S. 2,628,958; U.S. 3,256,230; U.S. 2,839,513; U.S. 3,282,905; U.S. 3,252,932; and U.S. 3,304,278.

Other $R_f$ groups containing monomers useful for copolymerization are fumarates, maleates, itaconates, and other $\alpha,\beta$-unsaturated di- and triesters as described in the copending application Ser. No. 199,793 and the following applications assigned to the assignee of the present invention: Ser. No. 720,370, filed Apr. 10, 1968, in the names of Eduard K. Kleiner and Martin Knell; Ser. No. 732,040, filed May 27, 1968, in the names of Eduard K. Kleiner, Martin Knell and Pier Luigi Pacini; Ser. No. 812,439, filed Apr. 1, 1969, in the name of Eduard K. Kleiner; Ser. No. 820,647, filed Apr. 30, 1969, in the name of Eduard K. Kleiner; and Ser. No. 833,606, filed June 16, 1969, in the names Eduard K. Kleiner and Pier Luigi Pacini.

As mentioned, it may also be desirable to include a minor amount of reactive comonomers in order to improve the wash and dry-clean properties of the novel tetxile finishes obtained according to the practice of this invention. Such monomers act as cross-linking agents during the curing operation. Such reactive comonomers are generally employed in amounts of 0.1% to 2%.

Other reactive monomers which may be included are by way of illustration: acrylic acid, methacrylic acid, acrylamide, methacrylamide, N-methylolacrylamide, 2-hydroxyethyl methacrylate or acrylate, hydroxypropyl acrylates or methacrylates, t-butylaminoethyl methacrylate, and glycidyl methylate. Of the foregoing, N-methylolacrylamide and 2-hydroxyethyl methacrylate are preferred.

Coatings of the homopolymers and copolymers according to the present invention can be prepared and applied from solvent solutions or from aqueous emulsions. Suitable solvents are fluoroalkanes, fluorochloroalkanes, fluoroalkyl substituted aromatics, alkyl esters of perfluoroalkanoic acids, chlorinated alkanes or aromatics, hydrocarbon aromatics, ketones, esters and ethers. Especially useful as solvents are the fluorinated liquids, and especially $\alpha,\alpha,\alpha$-trifluorotoluene, otherwise known as benzotrifluoride, hexafluoroxylene and mixtures of these with ethyl acetate or acetone and the like. Concentrations of the fluorinated polymers of the present invention in solvent to provide coatings with effective oil and water repellency properties will generally be of the order of 0.01 to 10% and preferably from 0.1 to 2.0% by weight. Blends of the emulsions of the polymers of this invention with blended emulsions of other polymers and copolymers are particularly useful in textile finishes. The polymers and copolymers are generally of a non-fluorinated type; however, as indicated below other fluorinated polymers and copolymers may be used if desired. Non-fluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly-n-octyl methacrylate. Also useful are polymers and copolymers of acrylic acid, methacrylic acid, styrene, alkyl styrene, butadiene, 2 - methyl -1,3 - butadiene, 2 - chloro - 1,3 - butadiene; polymers and copolymers of vinyl esters such as vinyl acetate, vinyl butyrate, vinyl laurate, vinyl stearate, vinyl 2 - ethyl - hexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, cetyl vinyl ether, and the like; polymers and copolymers of acrylamide, methacrylamide, N-methylol acrylamide, N - methylol methacrylamide, N-isopropyl acrylamide, and acrylonitrile and methacrylonitrile.

In the formation of the polymers disclosed herein it is most advantageous and desirable in the $R_fA$ group to keep the specific alkylene linkages $m$ and $n$ as small as possible. Longer alkylene linkage groups tend to increase the free surface energies of polymers of type II.

The selection of the linkage groups between $R_f$ and the polymerizable double bond of the di- and triacids depend largely on the desired solid state properties of polymer of type II. Substitution of an alkylene linkage of the type —$C_mH_{2m}$— with a more flexible alkylene-O-alkylene linkage of the type —$C_mH_{2m}OC_nH_{2n}$— or a stiffer carbon-carbon double bond linkage of the type —C=C— changes the solid state properties of a polymer of type II. By selecting a certain linkage group it is therefore possible to tailor a polymer of type II with desired solid-state properties. Softeness and hardness of a polymer (so-called hand) is an important factor for polymers which are utilized as textile finishes.

The polymers of this disclosure possess desirable soil repellency properties. A useful manner of measuring the relative ratings of the polymers is by oil and water repellency ratings. In the examples the following test procedures were used:

The AATCC Oil Rating was determined according to Standard Test Method 118–1966T of the American Association of Textile Chemists and Colorists. Ratings are given from 0 (minimum) to 8 (maximum). A commonly accepted level on soil repellency fabrics in the U.S. is an oil repellency of 4.

Another oil repellency method is the 3–M Oil Test procedure of Grajek and Peterson, Textile Research Journal, April 1962, p. 323.

The AATCC water spray test rating was determined according to Standard Test Method 22–1966 of the American Association of Textile Chemists and Colorists XXXVII, 1961, p. 1952 (also designated ASTM D–583–58). Ratings are given from 0 (minimum) to 100 (maximum).

The polymers in the examples were applied to polyestercotton (65/35%) at a concentration to yield 0.2% fluorine based on the weight of the fabric.

To further illustrate the innovative aspects of the present invention the following examples are provided.

EXAMPLE A 4-perfluoroheptyl-3-buten-1-ol, cis and trans, $C_7F_{15}CH=CHCH_2CH_2OH$ (a) Addition of perfluoroheptyl iodide, $C_7F_{15}I$, to 3-butyn-1-ol, $HC\equiv CCH_2CH_2OH$.—Perfluoroheptyl iodide (99.2 g., 0.200 mole) 3-btuyn-1-ol (redistilled Farchan Chem., B.P. 78° (99 mm.), $n_D^{25}$ 1.4390, 14.0 g., 0.200 mole) and ABN (0.654 g., 4.00×10$^{-3}$ mole) were charged to a Fischer-Porter aerosol pressure tube, cooled to —78°, evacuated to 0.55 mm. and filled with nitrogen three times and sealed. The tube was heated for 15.5 hr. at 70.0°. Unreacted materials were removed by distillation, B.P. 41° (28 mm.), $n_D^{25}$ 1.3340, 15.9 g., heating the flask to 119°. The residual oil 99.2 g., 88% conversion, solidified when cooled to room temperature. An IR spectrum showed $\nu$OH 3360, $\nu$C=C 1640 cm.$^{-1}$. The residue was distilled in a short path still, B.P. 80° (0.05 mm.) (bath 104–124°), 95.2 g., leaving only a few drops of residue. NMR analysis showed proton resonances at $\delta$ 2.31, singlet, OH group; $\delta$ 2.9, triplet, $CH_2CH_2OH$; $\delta$ 3.8, triplet, $CH_2CH_2OH$; and $\delta$ 6.47, triplet, $CF_2CH=CICH_2$. These data were consistent for structure of cis and trans $C_7F_{15}CH=CICH_2CH_2OH$.

*Analysis.*—Calcd. for $C_{11}H_6F_{15}IO$ (percent): C, 23.34; H, 1.07; F, 50.35; I, 22.42. Found (percent): C, 23.61; H, 1.16; F, 50.59; I, 22.45.

(b) Zinc reduction of 4-perfluoroheptyl-3-iodo-3-buten-1-ol, $C_7F_{15}CH=CICH_2CH_2OH$.—4-perfluoroheptyl-3-iodo-3-buten-1-ol (89.2 g., 0.157 mole) was added in portions to a rapidly stirred slurry of zinc (26.0 g., 0.40 g.-atom, Baker's analyzed) in anhydrous ethanol (400 ml.) while introducing hydrogen chloride gas from a cylinder. The reaction flask was fitted with a reflux condenser, paddle stirrer and gas inlet tube extending to one inch above the level of the stirred liquid, and heated to reflux temperature (78°). In 1.5 hrs. the zinc was gone and 10 g. additional zinc was added; after 2 hrs. this was repeated. Foaming occurred during the reaction and the flow of hydrogen chloride was regulated to maintain reaction of the zinc. After 6 hrs. the reaction flask was set up for distillation and ethanol (~350 ml.) removed up to 95° internal temperature. The residual brown oil was poured into 500 ml. of water, extracted 3 times with $CCl_4$ (50 ml.) and the extracts rinsed with aqueous sodium sulfite soln. The organic layer was dried (MgSO$_4$), filtered and distilled in a 24-inch platinum spinning band column. Fractions taken were: I, B.P. 104–107° (14 mm.), $n_D^{25}$ 1.3420, 10.9 g.; II, 111° (15 mm.), $n_D^{25}$ 1.3393, 25.1 g.; III, 110–109° (14 mm.), $n_D^{25}$ 1.3392, 20.0 g.; IV, 88–82° (3.2–2.5 mm.), $n_D^{25}$ 1.3421, 2.5 g. A dark brown residue of 4.0 g. remained. The combined fractions amounted to 85% recovery of

98.9% purity according to gas chromatographic analysis. The structure was confirmed by NMR analysis which gave $\delta$ 2.52, protons of OH and =C—$CH_2$; $\delta$ 3.7, —$CH_2OH$; $\delta$ 5.2–6.7, CH=CH.

*Analysis.*—Calc. for $C_{11}H_7C_{15}$ O (percent): C, 30.01; H, 1.60; F, 64.75. Found (percent): C, 30.38; H, 1.62; F, 64.50.

EXAMPLE B 4-perfluorobutyl-3-buten-1-ol, cis and trans, $C_4F_9CH=CHCH_2CH_2OH$ (a) Addition of perfluorobutyl iodide, $C_4F_9I$, to 3-butyn-1-ol, $HC\equiv CCH_2CH_2OH$.—Perfluorobutyl iodide (Thiokol Chem. Corp., redistilled, B.P. 68°, 69.2 g., 0.0210 mole), 3-butyne-1-ol (Farchan Lab., 14.0 g., 0.200 mole) and ABN (0.656 g., 4.00 mmoles) were charged to a Fischer-Porter aerosol flat-bottomed tube cooled to —78°, evacuated and filled with nitrogen 3 times and sealed. The tube was stirred by a magnet bar in an oil bath set at 70.0° C. for 26 hr. Distillation of the orange liquid (83.0 g.) in a two-ft. platinum spinning band column gave the following fractions: I, B.P. 36°/9.0 mm., $n_D^{25}$ 1.4383, 1.25 g. (3-butyne-1-ol); II–IV, B.P. 78–84°/2.5–3.5 mm., $n_D^{25}$ 1.4139; 64.94 g.

plus 2.5 g. residue in the distillation flask. The conversion to $C_4F_9CH=CI(CH_2)_2OH$ was 78%; total conversion to distilled products was 85%. An IR spectrum showed ν3500–3100, νCH 3050, νCH 2930, 2880, νC=C 1630; νCH 1350; νCF, 1250–1130; bands at 1050, 980 (w.), 930 (w.), 880, 740, 695, 590 and 520 cm.$^{-1}$.

Analysis.—Calcd. for $C_8H_6F_9IO$ (percent): C, 23.08; H, 1.45; F, 41.08; I, 30.49. Found (percent): C, 23.12; H, 1.47; F, 40.90; I, 30.68.

(b) Zinc reduction of 4-perfluorobutyl-3-buten-1-ol, $C_4F_9CH=ClCH_2CH_2OH$.—Ethanol (anhydrous, 300 ml.) was saturated with hydrogen chloride (Matheson, anhydrous from cylinder) while stirring at 72°. Zinc powder (10 g., 0.15 g.-atom, 30 mesh) and $$C_4F_9CH=Cl(CH_2)_2OH$$

(64.0 g., 0.153 mole) were added. The mixture foamed and turned colorless as additional portions of zinc powder (10 g., 0.15 g.-atom, 60–200 mesh) were added over a one hour period at 80°. After 4 hrs. the flask was set up for downward distillation heated with steam, and 200 ml. of ethanol was removed; the brown oil residue was poured into 200 ml. of water and extracted with benzene (2× 50 ml.), and ether (50 ml.). The organic extract was rinsed with aqueous bisulfite solution, dried over $MgSO_4$, and distilled in a 2-ft., platinum spinning band column. $C_4F_9CH=CH(CH_2)_2OH$, B.P. 93°/30 mm., $n_D^{25}$ 1.3453 was collected in 3 fractions; 39.2 g. (88%). A hold-up fraction (1.15 g.) was stripped from the column also, $n_D^{25}$ 1.3474 (total yield 91%). A residue (1.30 g.) remained. An infrared spectrum of the product showed νOH 3500–3100, νC=C 1665; and bands at 1050, 975, 925, 880, 865, 745 and 690 cm.$^{-1}$.

Analysis.—Calc. for $C_8H_7F_9O$ (percent): C, 33.11; H, 2.43; F, 58.94. Found (percent): C, 33.22; H, 2.56; F, 59.09.

EXAMPLE C 3-perfluoroheptyl-2-propen-1-ol, cis and trans, $C_7F_{15}CH=CHCH_2OH$ (a) Addition of perfluoroheptyl iodide, $C_7F_{15}I$, to 2-propyn-1-ol, $HC{\equiv}CCH_2OH$.—Perfluoroheptyl iodide (81.0 g., 0.163 mole), 2-propyn-1-ol (redistilled Aldrich, B.P. 112°, $n_D^{25}$ 1.4301, 9.2 g., 0.163 mole) and ABN (0.656 g., 4.00×10$^{-3}$ mole) were charged to a flat bottom Fischer-Porter aerosol tube, stirred by a magnet bar. The tube was cooled to −78°, evacuated and filled with nitrogen and sealed. The reaction mixture was heated to 70.0° C. in an oil bath and the two layers stirred rapidly to promote reaction. After 1.5 hr. the mixture had become homogeneous. Heating was continued for a total of 18.5 hr., and the orange liquid distilled. in variable take off still (no column). A mixture of perfluoroheptyl iodide and 2-propyn-1-ol (39.8 g.) was recovered, B.P. 35°/42 mm. The adduct $C_7F_{15}CH=ClCH_2OH$ distilled at B.P. 91–98° (1.5–2.2 mm.), $n_D^{25}$ 1.3863, 43.0 g. (48% conversion) leaving a residue of 3.4 g. The product solidified at room temperature. An infrared spectrum (KBr) showed νCH 2400–2300, νC=C 1640; bands at 990, 890, 835, 815, 740, 735, 720, 650 and 530 cm.$^{-1}$. An NMR spectrum was consistent. The olefinic protons gave a complex pattern at δ 6.1–7.2, the methylene protons appeared at δ 4.3 and the excangeable OH at 3.2.

Analysis.—Calc. for $C_{10}H_4F_{15}IO$ (percent): C, 21.75; H, 0.73; F, 51.63; I, 22.99. Found (percent): C, 21.77; H, 0.86; F, 51.45; I, 22.54.

(b) Zinc reduction of 3-perfluoroheptyl-2-iodo-2-propen-1-ol, $C_7F_{15}CH=ClCH_2OH$.—3-perfluoroheptyl-2-iodo-2-propen-1-ol (93.6 g., 0.170 mole), ethanol (500 ml.) and zinc (30 mesh, 30.0 g., 0.46 g.-atom) was heated to 82° and stirred rapidly while saturating with hydrogen chloride. After 2 hr., zinc (10.0 g., 0.153 g.-atom) was added and reaction continued for 2 hr. Ethanol (400 ml.) was distilled from the reaction mixture. On standing overnight the colorless liquid turned yellow. It was poured into 300 ml. of water and extracted with ether (150 ml., 50 ml.), with dichloromethane (50 ml. twice), rinsed with aqueous sodium bisulfite and dried ($MgSO_4$). An IR spectrum (salt plates) of sample 1 showed νOH 3500–3200, νCH 3050, 2980, 2930 and 2860, 2 sharp bands νC=C=C 2000 and 1960 cm.$^{-1}$, νC=C (d.) 1780–1760, heavy CF bands and bands at 1020, 980, 965, 880, 855, 830, 785, 730, 715, 695, 655, 640 cm.$^{-1}$. These data indicate than an allenic substance was present in the reaction mixture which decomposed on attempted distillation. Distillation in the 2-ft. platinum spinning band column gave evidence of decomposition in the pot liquid (turned dark red). Fractions collected: I, B.P. 32°/18 mm., $n_D^{25}$ 1.3670, 0.75 g., II to IV, B.P. 94–98°/13 mm., $n_D^{25}$ 1.3311, 38.9 g., and distillation residue, 21.5 g. The combined fractions II to IV were washed with 10 ml. of aqueous bisulfite solution, extracted into ether, dried ($MgSO_4$), and redistilled in a spinning band column. A fraction, B.P. 93–95°/10 mm., $n_D^{25}$ 1.3305, 31.6 g. was obtained. The NMR showed δ 1.99, a singlet, OH; δ 4.37, a multiplet, $CH_2$; δ 5.2–6.8; multiplet CH=CH; these data are consistent with the structure of $C_7F_{15}CH=CHCH_2OH$.

Analysis.—Calc. for $C_{10}H_5F_{15}O$ (percent): C, 28.18; H, 1.18; F, 66.88. Found (percent): C, 28.24; H, 1.28; F. 66.25.

EXAMPLE D 11-perfluoroheptyl-10-undecen-1-ol, cis and trans, $C_7F_{15}CH=CH(CH_2)_9OH$ (a) Addition of perfluoroheptyl iodide, $C_7F_{15}I$, to 10-undecen-1-ol, $CH_2=CH(CH_2)_9OH$.—$C_7F_{15}I$ (100 g., 0.200 mole), 10-undecen-1-ol (34.5 g., 0.202 mole) and ABN (0.990 g., 0.00600 mole) were charged to a flat-bottom 250 ml. Fisher-Porter aerosol bottle, cooled to −78°, evacuated and filled with nitrogen 3 times. The mixture was heated in an oil bath at 70.0° C. while stirring with a magnet bar in the bottle for 17 hr. The colorless, slightly cloudy liquid was pumped down to 0.30 mm. while heating to 116° to remove any unreacted $C_7F_{15}I$ (trap liquid, 3.0 g., $n_D^{25}$ 1.3760). The residual oil, 130.6 g. was distilled in a variable takeoff head (no column). A forerun, 4.24 g., $n_D^{25}$ 1.4125 and $$C_7F_{15}CH_2CHI(CH_2)_9OH$$

B.P. 129–132°/0.15 mm., $n_D^{25}$ 1.4101, 101.2 g. distilled, leaving a residue (6.0 g.). Infrared spectrum showed: νOH 3330, νCH 2930, 2850, δCH 1470, 1440, 1360, 1330; heavy CF bands at 1240–1150; bands at 990, 890, 840, 810, 740, 722, 712, 705, 665 and 640 cm.$^{-1}$. NMR showed: δ 1.2–2.2, 16 protons, multiplet $(CH_2)_8$; δ 2.23, 1 proton, singlet, OH; δ 2.4–3.4, 2 protons, multiplet $CF_2CH_2CHI$; δ 3.71, 2 protons triplet, $CH_2OH$; δ 4.43, 1 proton 5 lines, $CH_2$—CH—$CH_2$. These data were consistent for structure $C_7F_{15}CH_2CHI(CH_2)_9OH$.

Analysis.—Calc. for $C_{18}H_{22}F_{15}IO$ (percent): C, 32.45; H, 3.33; F, 42.78; I, 19.05. Found (percent): C, 32.90; H, 3.49; F, 42.50; I, 22.68.

(b) Dehydrohalogenation of 11-perfluoroheptyl-10-iodo-undecan-1-ol, $C_7F_{15}CH_2CHI(CH_2)_9OH$.—11-perfluoroheptyl-10-iodo-undecan-1-ol (110 g., 0.165 mole), was dissolved in ethanol (100 ml.) and added to a rapidly stirred solution of KOH (11.2 g., 0.200 mole) in 100 ml. of 90% aqueous ethanol. The temperature rose from 30 to 37° as the yellow color faded, and the mixture became foamy. After 23 hr., at 37°, ethanol was removed by distillation in a 6-inch packed column. The oil and separated salt was mixed with 100 ml. of water, extracted with 100, 50 and 25 ml. of ether and with 25 ml. of benzene, dried over $MgSO_4$ and distilled in a three ft. spinning band column. A forerun was yellow in color, B.P. 112–114°/0.25 mm., $n_D^{25}$ 1.3809, 4.0 g.; the products B.P. 113°/0.21 mm., $n_D^{25}$ 1.3766 and 1.3761, 49.1 and 28.3 g. was collected in two fractions; leaving a residue, 3.5 g. Yield of $$C_7F_{15}CH=CH(CH_2)_9OH$$

was 91.5% of theory. An infrared spectrum showed: νOH 3330, νCH 2930, 2850; νC=C 1670; heavy CF bands at 1250–1150; and bands at 1095, 1055, 1020, 1008, 970, 870, 820, 790, 725, 720, 700, 680 cm.$^{-1}$. The fractions were combined, treated with activated carbon to remove yellow color, rinsed with ether and redistilled in the spinning band column. A forerun, B.P. 100–132°/ 1.0 mm., 2.05 g., a yellow oil was again obtained; succeeding fractions were almost colorless. The final fraction, B.P. 112°/0.22 mm., $n_D^{25}$ 1.3755, 54.5 g. was submitted for analysis. The NMR showed: δ 1.32, 14 protons, broad singlet, $(CH_2)_7$; δ 1.54, 1 proton, sharp singlet, OH; δ 2.2, 2 protons, broad multiplet, C=C—$CH_2$; δ 3.63, 2 protons, triplet $CH_2$—OH; δ 5.0–6.8, 2 protons, multiplet, CH=CH. These data are consistent with the postulated structure.

*Analysis.*—Calc. for $C_{18}H_{21}F_{15}O$ (percent): C, 40.15; H, 3.93; F, 52.94. Found (percent): C, 40.10; H, 3.95; F, 53.08.

EXAMPLE E

11-Perfluoroisopropyl-10-undecen-1-ol, cis and trans,
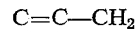

(a) Addition of perfluoroisopropyl iodide. $(CF_3)_2CFI$, to 10-undecen-1-ol, $CH_2=CH(CH_2)_9OH$.—A Fischer-Porter aerosol tube was charged with ABN (0.656 g., 4.00 mmoles), 10-undecen-1-ol (34.1 g., 0.200 mole, Aldrich 99%) and perfluoroisopropyl iodide (62.5 g., 0.210 mole,) cooled to —78°, evacuated and filled 3 times with nitrogen and sealed. The reaction tube was heated at 70° for 26 hr. and the colorless liquid (95.4 g.) was transferred to a flask and distilled in a variable take-off head without column. A forerun, B.P. 102–112°/0.40 mm., 1.4398, 1.2 g. was removed, and three fractions of $(CF_3)_2CFCH_2CHI(CH_2)_9OH$ were collected. A small amount (6.0 g.) of the very volatile $(CF_3)_2CFI$ collected in the Dry Ice trap. The total distilled products amounted to a 91% yield. An infrared spectrum of the sample showed νOH 3500–3100, νCH 2930, 2950, δCH 1460, 1430, 1370, 1340; νCF 1300–1210, 1150; and bands at 1110, 1060–1040, 950, 770, 728, 615, 540 and 510 cm.$^{-1}$.

*Analysis.*—Calc. for $C_{14}H_{22}F_7IO$ (percent): C, 36.06; H, 4.76; F, 28.53; I, 27.22. Found (percent): C, 36.19; H, 4.76; F, 28.62; I, 27.28.

(b) Dehydrohalogenation of 11-perfluoroisopropyl-10-iodo-undecan - 1 - ol, $(CF_3)_2CFCH_2CHI(CH_2)_9OH$.—Potassium hydroxide (11.2 g., 0.200 mole) was dissolved in 59 ml. of water, 200 ml. of ethanol added and the solution stirred by magnet bar as $(CF_3)_2CFCH_2CHI(CH_2)_9OH$ (79.4 g., 0.170 mole), was added at 35°. A yellow color appeared initially and disappeared in a few minutes. The solution was kept at 35° while stirring for 15.5 hr., poured into 100 ml. of water and the aqueous layer extracted with 100, 50 and 30 ml. of ether, using salt to assist in separating the layers in the first extraction. The combined orange-colored organic fraction was extracted with aqueous sodium bisulfite, rinsed with benzene, dried over $MgSO_4$ and passed over activated alumina to remove color and polar impurities. The product mixture was distilled in a variable takeoff head without a column: I, B.P. 109–111°/2.2 mm., $n_D^{25}$ 1.3986, 28.1 g.; II, B.P. 115–116°/ 2.4 mm., $n_D^{25}$ 1.3964, 17.9 g.; III, B.P. 108–109°/1.50 mm., $n_D^{25}$ 1.3964, 7.5 g.; total recovery of

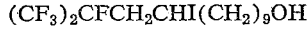

53.3 g., 94% yield. An infrared spectrum showed νOH 3500–3100; νCH 2930, 2850; νC=C 1670; δCH 1460, 1440, νCF 1300–1200, 1180; bands at 1050, 980, 740, 720, 710 and 535 cm.$^{-1}$. The combined fractions I, II and III were redistilled in an adiabatic spinning band column at B.P. 78–82° C./0.1 mm. The NMR showed: δ 1.32, 14 protons, broad singlet, $(CH_2)_7$; δ 1.72, 1 proton, sharp singlet, OH; δ 2.18, 2 protons, broad multiplet,

C=C—$CH_2$

δ 3.6, 2 protons, triplet $CH_2$—OH; δ 5–6.8, 2 protons, multiplet, CH=CH. These data are consistent with the structure of $(CF_3)_2CFCH=CH(CH_2)_9OH$.

*Analysis.*—Calc. for $C_{14}H_{21}F_7O$ (percent): C, 49.70; H, 6.25; F, 39.31. Found (percent): C, 50.61; H, 6.37; F, 39.11.

EXAMPLE F 6-perfluoroheptyl-3-oxa-5-hexen-1-ol, cis and trans, $C_7F_{15}CH=CHCH_2OCH_2CH_2OH$ (a) Addition of perfluoroheptyl iodide, $C_7F_{15}I$, to β-allyloxyethanol, $CH_2=CHCH_2OCH_2CH_2OH$.—Perfluoroheptyl iodide (165 g., 0.334 mole), β-allyloxyethanol (34.4 g., 0.334 mole, B.P. 63° (16 mm.), $n_D^{25}$ 1.4329) and ABN (ABN, 2.2775 g., 0.0134 mole) were charged to a Fischer-Porter aerosol pressure tube, cooled to —78°, evacuated to 0.55 mm. and filled with nitrogen three times and sealed. The tube was heated in a bath at 70.0° for 22 hr. The yellow liquid (201.2 g.) was distilled from an oil bath in a short path still, B.P. 100° (0.15 mm.), $n_D^{25}$ 1.3914, 175.7 g., and B.P. 101° (0.18 mm.), $n_D^{25}$ 1.3924, 2.6 g. A black residue of 8.8 g. remained. The trap liquid (11.8 g., $n_D^{25}$ 1.3309) was principally recovered $C_7F_{15}I$. The conversion to 5-iodo-6-pentadecafluoroheptyl-3-oxa-hexan-1-ol $C_7F_{15}CH_2CHICH_2OCH_2CH_2OH$, was 90% and the yield 95%.

(b) Dehydrohalogenation of 6-perfluoroheptyl-5-iodo-3-oxahexan - 1 - ol, $C_7F_{15}CH_2CHICH_2OCH_2CH_2OH$.—6-perfluoroheptyl-5-iodo-3-oxahexan-1-ol (90.0 g., 0.150 mole) was added to a stirred solution of KOH (11.2 g., 0.200 mole) in 250 ml. of 60% aqueous ethanol, kept at 35° for 12 hr. and allowed to stand 3 days. The colorless solution was distilled, at reduced pressure to remove ethanol (225 ml.). Water (100 ml. was added to the residue, and extracted 3 times with ether (50 ml.). The combined ether extracts were dried ($MgSO_4$) and distilled. 6-pentadecafluoroheptyl-3-oxa-5-hexenol, $C_7F_{15}CH=CHCH_2OCH_2OH$ B.P. 98–100° (1.5 mm.), $n_D^{25}$ 1.3490, 65.2 g. (93%) was collected in 3 fractions of constant B.P. and refractive index. A residue of 2.8 g. remained. An infrared spectrum (KBr, liquid film) showed νOH 3600–3300, νCH 2930 and 2860, νC=C 1680, δCH 1470, 1450 and 1360, νCF 1260–1200, 1150 and bands at 1030, 985, 965, 890, 840, 805, 735, 708, 700, 660, 640 and 530 cm.$^{-1}$. The bands 1680, 985, 965 and 890 are associated with the

group. The 3 fractions were combined and redistilled in a 3-ft. stainless steel spinning band column, B.P. 96°/1.4 to 85°/0.80 mm. NMR showed: δ 2.82, singlet, OH; δ 3.61, multiplet, $OCH_2CH_2OH$; δ 4.17, =$CHCH_2O$; and δ 5.5–6.7, multiplet —CH=CH—. These data were consistent for structure $C_7F_{15}CH=CHCH_2OCH_2CH_2OH$.

*Analysis.*—Calc. for $C_{12}H_9F_{15}O_2$ (percent): C, 30.65; F, 60.61; H, 1.93. Found (percent): C, 31.10; F, 60.00; H, 2.10.

EXAMPLE G 6-perfluoroheptyl-3-oxahexan-1-ol,
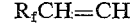

Catalytic hydrogenation of 6-perfluoroheptyl-5-iodo-3-oxahexan-1-ol, $C_7F_{15}CH_2CHICH_2OCH_2CH_2OH$ (Example F(a)).—6-perfluoroheptyl-5-iodo-3-oxahexan - 1 - ol (59.8 g., 0.100 mole), potassium hydroxide (8.4 g., 0.15 mole) dissolved in methanol (150 ml.) and 5% palladium on carbon (Matheson, Coleman and Bell) (4.0 g.) were charged to a Parr hydrogenation bottle, and the mixture shaken at 32–35° for 14.5 hr. at 40 p.s.i. The pressure dropped from 40 to 35.5 p.s.i. in 10 min.; when re-pressured to 45 p.s.i., the pressure dropped to 40 p.s.i. in 1 hr., and remained unchanged. The drop in pressure corresponded to 0.11 mole of hydrogen. The mixture was filtered, methanol removed by distillation, water (100 ml.) added to the slurry and product extracted into ether (50 ml. three times). The combined extracts were dried (MgSO$_4$) and distilled in a 24-inch platinum spinning band column. The first fraction was yellow, B.P. 88–94° (1.1 mm.), $n_D^{25}$ 1.3451, 3.85 g. Fraction II, B.P. 94° (1.0 mm.), $n_D^{25}$ 1.3443, 12.0 g. was slightly yellow, and fraction III, B.P. 95° (1.0 mm.), $n_D^{25}$ 1.3430, 24.57 g., was almost colorless. The total recovery of $$C_7F_{15}CH_2CH_2CH_2OCH_2CH_2OH$$

was 85%. A residue of 1.4 g. remained. An IR spectrum (KBr, liquid film) showed $\nu$OH 3400, $\nu$CH 2950, 2880; $\delta$CH 1450, 1360, $\nu$CF 1280–1150; bands at 985, 890, 835, 805, 745, 720, 710, 700, 655, 565, and 540 cm.$^{-1}$. The bands at 1675 and 965 in the unsaturated compound were absent in the product NMR showed: $\delta$ 1.6–2.9, multiplet, CF$_2$CH$_2$CH$_2$CH$_2$O; $\delta$ 3.55, multiplet, CH$_2$OCH$_2$CH$_2$OH; $\delta$ 2.95 (or 2.48) OH exchangeable proton. These data were consistent for structure $$C_7F_{15}CH_2CH_2CH_2OCH_2CH_2OH$$

*Analysis.*—Calc. for $C_{12}H_{11}F_{15}O_2$ (percent): C, 30.52; H, 2.35; F, 60.35. Found (percent): C, 30.49; H, 2.27; F, 60.24.

EXAMPLE H 4-perfluoroisopropoxy-1,1,2,2-tetrahydroperfluorobutyl acetate, (CF$_3$)$_2$CFOCF$_2$CF$_2$CH$_2$OOCCH$_3$ 4-perfluoroisopropoxy - 1,1,2,2 - tetrahydroperofluorobutyl iodide, (CF$_3$)$_2$CFOCF$_2$CF$_2$CH$_2$CH$_2$I (35.2 g. 0.080 mole, prepared according GC–547, Example 2), cadmium oxide (10.25 g., 0.080 mole) and glacial acetic acid (140 g.) were charged into a magnetically stirred stainless steel autoclave. The autoclave was sealed, then heated to 180–182° C. (inside temperature) for 20 hours. The reaction mixture was then added to 300 ml. of water. 2 layers were obtained; they were separated and retained. The lower organic layer was distilled through a Vigreaux column. The product (18.0 g.) was obtained at 99–102° C./90–95 mm. Hg and was shown by VPC to be pure. The upper aqueous layer was then extracted with 50 ml. of chloroform. The extract was washed successively with 10% sodium bicarbonate, then water, and was then dried over sodium sulfate. The chloroform layer was then combined with the residue of the above mentioned distillation, the solvent was distilled off and the residual oil then yielded 2.5 g. of product which distilled over at 96° C./80 mm. Hg. A total of 20.5 g. of $$(CF_3)_2CFOCF_2CF_2CH_2CH_2OOCCH_3$$

was obtained (69% yield). IR and NMR analysis confirmed the structure.

*Analysis.*—Calc. for $C_9H_7F_7O_3$ (percent): C, 29.04; H, 1.90; F, 56.16. Found (percent): C, 29.21; H, 1.91; F, 56.01.

EXAMPLES I AND J 6-perfluoroisopropoxy - 1,1,2,2 - tetrahydroperfluorohexyl acetate, (CF$_3$)$_2$CFO(CF$_2$)$_4$CH$_2$CH$_2$OOCCH$_3$, and 8-perfluoroisopropoxy - 1,1,2,2 - tetrahydroperfluorooctyl acetate, (CF$_3$)$_2$CFO(CF$_2$)$_6$CH$_2$CH$_2$OOCCH$_3$ 6-perfluoroisoproxy - 1,1,2,2 - tetrahydroperfluorohexyl iodide, (CF$_3$)$_2$CFO(CF$_2$)$_4$CH$_2$CH$_2$I (prepared according Example 3 in GC–547) and 8-perfluoroisopropoxy-1,1,2,2-tetrahydroperfluorooctyl iodide (prepared according Example 4 in GC–547) were converted into the acetates (CF$_3$)$_2$CFO(CF$_2$)$_4$CH$_2$CH$_2$OOCCH$_3$ (I) and $$(CF_3)_2CFO(CF_2)_6CH_2CH_2OOCCH_3$$

(J) employing the synthesis method described in Example H.

EXAMPLES K, L AND M 4-perfluoroalkyl-3-buten-1-ol, cis and trans, $$R_fCH=CHCH_2CH_2OH$$

(K), 6-perfluoroalkyl-3-oxa-5-hexen-1-ol, cis and trans, R$_1$CH=CHCH$_2$OCH$_2$CH$_2$OH (L), 6 - perfluoroalkyl-3-oxahexan - 1 - ol, R$_f$CH$_2$CH$_2$CH$_2$OCH$_2$CH$_2$OH (M)

A mixture of perfluoroalkyl iodides having the following composition:

| | |
|---|---|
| $C_4F_9I$ | percent 0.8 |
| $C_6F_{13}I$ | do 26.7 |
| $C_8F_{17}I$ | do 45.5 |
| $C_{10}F_{21}I$ | do 23.4 |
| $C_{12}F_{25}I$ | do 2.6 |
| Unknowns | do 0.6 |
| Iron | p.p.m. 10 |
| Free iodine | do 515 |

(Percentage indicates area percentages as determined by VPC analysis).

is converted (a) into R$_f$CH=CHCH$_2$CH$_2$OH (K) employing the 2-step synthesis shown in Example A, and (b) into R$_f$CH=CHCH$_2$OCH$_2$CH$_2$OH (L) employing the 2-step synthesis shown in Example F, and (c) into R$_f$CH$_2$CH$_2$CH$_2$OCH$_2$CH$_2$OH (M) employing the catalytic hydrogenation method described in Example G.

EXAMPLE 1

Bis(4-perfluoroisopropoxy-1,1,2,2-tetrahydroperfluorobutyl) fumarate,

trans 4-perfluoroisopropoxy-1,1,2,2-tetrahydroperfluorobutyl-acetate, 20.0 g., 0.054 mole (Example H), diethyl fumarate (3.62 g., 0.021 mole), para-toluene sulfonic acid monohydrate (1.025 g., 0.0054 mole) were charged into a 3-neck flask equipped with a nitrogen inlet, magnetic stirrer and a reflux regulating distillation head (Kontes K–287600). While a slow stream of nitrogen was passed through the system, the reactants were heated to 145° C. for 2 hours; then the temperature was raised to 150° C. and ethyl acetate slowly distilled over. Then, after 19 hours of heating, the temperature was raised to 160° C. and maintained there for one hour while a slight vacuum (360 mm. Hg) was pulled. The reaction mixture was cooled, then triethylamine (1.6 g., 0.016 mole) was added to complex the p-toluene sulfonic acid. The mixture was then distilled and the product was obtained as a colorless liquid (B.P. 110° C./0.2 mm. Hg) in a 75% yield (11.65 g.), VPC showed the product to be pure. The NMR showed proton resonances at $\delta$ 2.47, 4 protons in triplets of a triplet (CF$_2$CH$_2$CH$_2$)×2; $\delta$ 4.5, 4 protons in a triplet, (CH$_2$CH$_2$O)×2; $\delta$ 6.85, 2 protons in a singlet

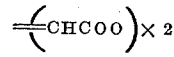

These data confirm the above structure.

*Analysis.*—Calc. for $C_{18}H_{10}F_{22}O_6$ (percent): C, 29.20; H, 1.36; F, 56.47. Found (percent): C, 29.33; H, 1.38; F, 56.74.

EXAMPLE 2

Bis[4-(perfluoroheptyl)-3-butenyl] fumarate

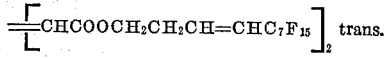
trans.

4-perfluoroheptyl-3-buten-1-ol (20.4 g., 0.046 mole, Example A), spectrograde toluene (80 g.) and fumaryl chloride (3.48 g., 0.02275 mole, distilled) were charged into a 3-neck flask equipped with a reflux condenser (protected by a drying tube), nitrogen inlet and a magnetic stirrer. The mixture was refluxed for 29 hours after which time VPC analysis showed a conversion of 91%. The reaction mixture was cooled, and passed through a column containing neutral aluminum oxide (Alox, activity I) to remove unreacted acid chloride and fluoroalcohol. The column was washed with five portions of dry benzene (125 ml. each) and the solvent of the combined fractions was stripped off in a rotary evaporator. The oily residue was distilled in a short path distillation apparatus, B.P. 182° C./0.4 mm., and 15.4 g. of a colorless oil was obtained (70.6% yield), showing one single peak by VPC. The NMR showed proton resonances at δ 2.65, 4 protons, multiplets, —OC$\underline{H_2}$CH$_2$— δ 4.25, 4 protons, triplet —OCH$_2$C$\underline{H_2}$CH=; δ 5.15–6.68, 4 protons, multiplets, —C$\underline{H}$=C$\underline{H}$—C$_7$F$_{15}$; δ 6.78, 2 protons, singlet, —COC$\underline{H}$=C$\underline{H}$CO—.

These data are consistent for the above structure.
*Analysis.*—Calc. for C$_{26}$H$_{14}$F$_{30}$O$_4$ (percent): C, 32.51; H, 1.47; F, 59.35. Found (percent): C, 32.32; H, 1.50; F, 59.43.

EXAMPLE 3

Bis[4-(perfluoroheptyl)-3-butenyl] itaconate,

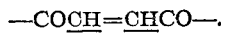
CH$_2$=C(COOCH$_2$CH$_2$CH=CHC$_7$F$_{15}$)
             CH$_2$COOCH$_2$CH$_2$CH=CHC$_7$F$_{15}$ 4-perfluoroheptyl-3-buten-1-ol (16.0 g., 0.0362 mole, Example A), spectrograde toluene (70.0 g.) and itaconyl chloride 13.2 g., 0.0181 mole, distilled were charged into a 3-neck flask which had been equipped with a condenser (protected by a drying tube), nitrogen inlet and a magnetic stirrer. The reactants were refluxed for 40 hours after which time a VPC analysis showed a conversion of 87% to the diester. The cooled reaction mixture was then passed through a column containing neutral aluminum oxide (activity I) to remove unreacted alcohol and acid chloride. The product was washed from the column with 3–125 ml. portions of benzene. The fractions were combined and the solvent was stripped off in a rotary film evaporator. The oily residue (13.4 g.) was distilled in a short path distillation apparatus and 8.4 g. of a pure product, B.P. 180–181° C./0.5 mm., was obtained (48% yield). A VPC analysis showed one single peak. The NMR spectrum showed proton resonances at δ 2.1–3.2, 4 protons overlapping multiplets, —CH$_2$C$\underline{H_2}$CH=CH—; δ 3.32, 2 protons, singlet, —C$\underline{H_2}$COOCH$_2$; δ 4.0–4.5, 4 protons, complex multiplet, COOC$\underline{H_2}$CH$_2$; δ 5.4–7.0, 4 protons, complex multiplets, CH$_2$C$\underline{H}$=C$\underline{H}$CF$_2$; δ 5.72 and δ 6.32, 2 protons, apparent singlets, C$\underline{H_2}$=C.

These data are consistent for the above structure.
*Analysis.*—Calc. for C$_{27}$H$_{16}$F$_{30}$O$_4$ (percent): C, 33.28; H, 1.66; F, 58.50. Found (percent): C, 33.31; H, 1.69; F, 59.22.

EXAMPLE 4

Bis[4-(perfluorobutyl)-3-butenyl]fumarate

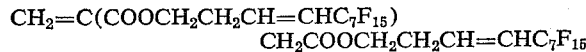

4-perfluorobutyl-3-buten-1-ol (21.0 g., 0.0725 mole, Example B), spectrograde (80 g.) and fumaryl chloride (5.28 g., 0.0345 mole, distilled) were charged into a 3-neck flask equipped with a condenser (protected with a drying tube), a nitrogen inlet and a magnetic stirrer. The mixture was refluxed for 20 hours, then cooled and passed through a column of neutral aluminum oxide (activity I). The product was washed off the column with benzene and the benzene was removed by evaporation in a rotary evaporator and the oily residue was distilled in a short path apparatus. The product (B.P. 150–152° C./0.6 mm.; 17.3 g.) was obtained in 76% yield and was shown by VPC analysis to be pure. The NMR spectrum showed proton resonances at δ 2.7, 4 protons, unresolved multiplet, —CH$_2$C$\underline{H_2}$CH=;

δ 4.32, 4 protons, triplet, —COOC$\underline{H_2}$CH$_2$; δ 5.2–6.6, 4 protons, complex multiplets —C$\underline{H}$=C$\underline{H}$CF$_2$; δ 6.82, 2 protons, singlet,

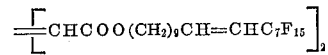

These data are consistent for the above structure.
*Analysis.*—Calc. for C$_{20}$H$_{14}$F$_{18}$O$_4$ (percent): C, 36.38; H, 2.14; F, 56.79. Found (percent): C, 36.45; H, 2.23; F, 52.31.

EXAMPLE 5

Bis[11-(perfluoroheptyl)-10-undecen-1-yl]fumarate

11-perfluoroheptyl-10-undecen-1-ol (20.0 g., 0.0372 mole, Example D) spectrograde toluene (80 g.) and fumaryl chloride (12.84 g., 0.0186 mole, distilled) were refluxed as in Example 2. After 22 hours the reaction was complete as shown by VPC and IR analyses. The reaction mixture was cooled and then passed through a column of aluminum oxide (neutral, activity I). The product was washed from the column with four-125 ml. portions of benzene. The wash fractions were combined and the solvent was removed on a rotary film evaporator. The residue was crystallized from petroleum ether. The purified product (white crystals M.P. 36–37.5° C.) was obtained in a 54% yield (1.6 g.) A small sample of this was recrystallized 2 times from petroleum ether, M.P. 38–39° C. The NMR spectrum showed proton resonances at δ 1.2–1.9, 28 protons, singlet and broad multiplets –(CH$_2$)$_7$; δ 1.9–2.55, 4 protons, broad, —CH$_2$C$\underline{H_2}$—CH=CH; δ 4.20, 4 protons, triplet —OC$\underline{H_2}$CH$_2$; δ 5.0–6.6, 4 protons, complex multiplicity, —CH$_2$—C$\underline{H}$=C$\underline{H}$—CF$_2$; δ 6.85, 2 protons, singlet,

These data are consistent for the above structure.
*Analysis.*—Calc. for C$_{40}$H$_{42}$F$_{30}$O$_4$ (percent): C, 41.53; H, 3.66; F, 49.28. Found (percent): C, 41.75; H, 3.63; F, 49.31.

EXAMPLE 6

Bis[11-(perfluoroisopropyl)-10-undecen-1-yl]fumarate

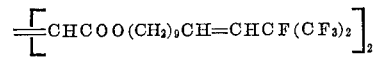

11 - perfluoroisopropyl-10-undecen-1-ol (21.0 g., 0.062 mole, Example E), spectrograde toluene (80 g.) and fumaryl chloride (4.52 g., 0.0295 mole, distilled) were refluxed as in Example 1. After 24 hours of reflux, the reaction was complete as shown by VPC analysis. The toluene was stripped off on a rotary film evaporator. The oily residue, 24 g., was distilled in a short path distillation apparatus. The product was obtained as a colorless oil (B.P. 228° C./0.5 mm.) in 78.5% yield (17.5 g). The NMR spectrum showed proton resonances at δ 1.1–2.4, 32 protons, singlet and complex multiplets, —OCH$_2$(C$\underline{H_2}$)$_8$CH=;

δ 4.15, 4 protons, triplet, OC$\underline{H_2}$(CH$_2$)$_8$; δ 5.1–5.8, 2 protons, doublet of doublet, C$\underline{H}$=CHCF; δ 6.0–6.6, 2 protons, triplet of doublets, —C$\underline{H}$=CH—CF; δ 6.8, 2 protons, singlet,

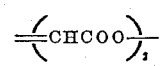

These data are consistent for the above structure.

Analysis.—Calc. for $C_{32}H_{42}F_{14}O_4$ (percent): C, 50.79; H, 5.60; F, 35.15. Found (percent): C, 51.09; H, 5.54; F, 34.99.

EXAMPLE 7

Bis[6-(perfluoroheptyl)-3-oxa-5-hexen-1-yl]fumarate

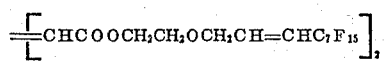

6-perfluoroheptyl-3-oxa-5-hexen-1-ol (22.0 g., 0.0467 mole, Example F), spectrograde toluene (80 g.) and fumaryl chloride (3.26 g., 0.02125 mole, distilled) were refluxed as in Example 2. As indicated by VPC analysis, the reaction was complete after 14 hours of reflux. The reaction mixture was cooled and then passed through a column of neutral aluminum oxide (activity I). The product was washed from the column with 350 ml. of benzene, and was then stripped of solvent on a rotary film evaporator. The liquid residue was distilled (B.P. 205–206° C./0.4 mm.) in a short path distillation apparatus; 13.7 g. of product was obtained (yield—63%) which showed one peak by VPC analysis. The NMR spectrum showed proton resonances at δ 3.75, 4 protons, complex multiplet, —COOC$\underline{H_2}$CH$_2$O—CH$_2$—; δ 4.30, 8 protons, overlapping multiplets, —COOCH$_2$C$\underline{H_2}$OC$\underline{H_2}$—; δ 5.7–6.8, 4 protons, complex —CH$_2$—C$\underline{H}$=C$\underline{H}$CF$_2$; δ 6.95, 2 protons, singlet,

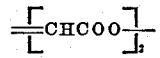

These data are consistent for the above structure.

Analysis.—Calc. for $C_{28}H_{18}F_{37}O_6$ (percent): C, 32.96; H, 1.78; F, 55.86. Found (percent): C, 32.79; H, 1.75; F, 56.16.

EXAMPLE 8

Bis[6-(perfluoroheptyl)-3-oxa-5-hexane-1-yl]itaconate

6-perfluoroheptyl-3-oxa-5-hexen-1-ol (22.0 g., 0.0467 mole, Example F), spectrograde toluene (80 g.) and itaconyl chloride (3.55 g., 0.02125 mole, distilled) were refluxed, as in Example 1, for 48 hours at which time a VPC analysis showed a complete reaction. The reaction mixture was then passed through a column of neutral aluminum oxide (activity I). The product was washed from the column with 3× 125 ml. portion of benzene. The fractions were combined, and the solvent was stripped off on a rotary film evaporator. The oily residue was distilled in a short path distillation apparatus yielding 8.4 g. (38% yield) of product (B.P. 208–216° C./0.8 mm.). The product yielded one single peak by VPC analysis. The NMR spectrum showed proton resonances at δ 3.38, 2 protons in a singlet, =C(COO—)CH$_2$COO—; δ 3.5–3.9, 4 protons in unresolved multiplets, 2×

CH$_2$C$\underline{H_2}$OCH$_2$

δ 3.95–4.7, 8 protons in unresolved multiplets, 2×

COOC$\underline{H_2}$CH$_2$OC$\underline{H_2}$CH=

δ 5.65–7.0, 4 protons in complex overlapping multiplets 2× CH=CHCF$_2$; δ 5.75 and δ 6.35, 2 protons in apparent singlets, C$\underline{H_2}$=C<.

These data are consistent for the above structure.

Analysis.—Calc. for $C_{29}H_{20}F_{30}O_6$ (percent): C, 33.67; H, 1.95; F, 55.10. Found (percent): C, 33.58; H, 1.95; F, 54.89.

EXAMPLE 9

Bis[6-(perfluoroheptyl)-3-oxahex-1-yl]fumarate

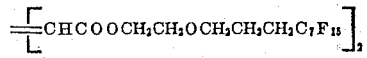

6 - perfluoroheptyl - 3-oxahexan-1-ol (19.0 g., 0.0402 mole, Example G), spectrograde toluene (80 g.) and fumaryl chloride (3.08 g., 0.0201 mole, distilled) were refluxed, as in Example 2, for 30 hours at which time a VPC check showed a complete reaction. The reaction mixture was cooled and then passed through a column of neutral aluminum oxide (activity I). The product was washed from the column with 500 ml. of benzene. The solvent was then stripped off on a rotary film evaporator and the oily residue was distilled in a short path distillation apparatus yielding 12.5 g. (60.7% of theoretical yield) of product (B.P. 202° C./0.4 mm.). The purified product showed one single peak by VPC analysis. The NMR spectrum showed proton resonances at δ 1.5–2.7, 8 protons in broad unresolved signals, 2×

(OCH$_2$C$\underline{H_2}$C$\underline{H_2}$C$_7$F$_{15}$)

δ 3.6, 8 protons in overlapping multiplets, 2×

(OC$\underline{H_2}$CH$_2$OC$\underline{H_2}$CH$_2$)

δ 4.30, 4 protons in overlapping multiplets, 2×

(COOC$\underline{H_2}$CH$_2$O)

δ 6.85, 2 protons in a singlet, —C$\underline{H}$=C$\underline{H}$—.

These data are consistent for the above structure.

Analysis.—Calc. for $C_{28}H_{22}F_{30}O_6$ (percent): C, 32.83; H, 2.17; F, 55.64. Found (percent): C, 32.91; H, 2.15; F, 56.10.

EXAMPLE 10

Bis[6-(perfluoroheptyl)-3-oxahex-1-yl]itaconate

6 - perfluoroheptyl - 3-oxahexan-1-ol (19.0 g., 0.0402 mole, Example G), spectrograde toluene (80 g.) and itaconyl chloride (3.36 g., 0.0201 mole, distilled) were refluxed, as in Example 1, for 50 hours. A VPC check at this time showed a complete reaction. The reaction mixture was cooled and then passed through a column of neutral aluminum oxide (activity I). The product was washed from the column with 375 ml. of benzene which was then stripped off on a rotary film evaporator. The oily residue was distilled in a short path distillation apparatus yielding 10.7 g. (51.4% of theoretical yield) of product B.P. 183–187° C./.02 mm.). The product was shown to be pure by VPC analysis. The NMR spectrum showed proton resonances at δ 1.45–2.85, 8 protons in broad unresolved multiplets, 2× (OCH$_2$C$\underline{H_2}$C$\underline{H_2}$CF$_2$); δ 3.32, 2 protons in a singlet, =C(COO—)C$\underline{H_2}$COO—; δ 3.2–4.1; 8 protons in overlapping multiplets, 2×

(C$\underline{H_2}$C$\underline{H_2}$OC$\underline{H_2}$CH$_2$)

δ 4.0–4.8, 4 protons in overlapping triplets, 2×

(COOC$\underline{H_2}$CH$_2$O)

δ 5.65 and δ 6.35, 2 protons in singlets, C$\underline{H_2}$=C<.

These data are consistent for the above structure.

Analysis.—Calc. for $C_{29}H_{24}F_{30}O_6$ (percent): C, 33.54; H, 2.33; F, 54.89. Found (percent): C, 33.61; H, 2.40; F, 54.03.

EXAMPLES 11 TO 15

R$_f$-acetates I and J and R$_f$-alcohols K, L and M were converted into α,β-unsaturated di- and triesters of type I as listed in Table 1 by employing transesterification methods as described in the previous Examples 1, 2 and 3.

TABLE 1

| Example number | $R_f$-acetate or $R_f$-alcohol | + | Polyacid or ester | → | $R_f$-monomer of Type I |
|---|---|---|---|---|---|
| 11 | $2(CF_3)_2CFO(CF_2)_2CH_2CH_2OOCCH_3$ Example I | + | $\left[\begin{array}{c}=CHCOOC_2H_5\end{array}\right]_2$ cis | → | $\left[\begin{array}{c}=CHCOOCH_2CH_2(CF_2)_2OCF(CF_3)_2\end{array}\right]_2$ cis |
| 12 | $2(CF_3)_2CFO(CF_2)_2CH_2CH_2OOCCH_3$ Example J | + | $CH_2=C(COOCH_3)CH_2COOCH_3$ | → | $CH_2=COOCH_2CH_2(CF_2)_2OCF(CF_3)_2$<br>$CH_2COOCH_2CH_2(CF_2)_2OCF(CF_3)_2$ |
| 13 | $2R_fCH=CHCH_2CH_2OH$ Example K | + | ![cyclic anhydride structure]<br>$\begin{array}{c}CH-CO\\\|\quad\quad\;\;O\\CH-CO\end{array}$ | → | $\left(=CHCOOCH_2CH_2CH=CHR_f\right)_2$ cis |
| 14 | $2R_fCH=CHCH_2CH_2OH$ Example L | + | $\left(=CHCOOH\right)_2$ trans | → | $\left(=CHCOOCH_2CH_2CH=CHR_f\right)_2$ trans |
| 15 | $3R_fCH_2CH_2OCH_2CH_2OH$ Example M | + | $H_3COOC\quad\quad COOCH_3$<br>$\quad\;\;C=C$<br>$H_3COOCCH_2\quad H$ | → | $R_fCH_2CH_2OCH_2CH_2OOC\quad COOCH_2CH_2OCH_2CH_2R_f$<br>$\quad\quad\quad\quad\quad\quad C=C$<br>$\quad\quad\quad\quad\quad R_fCH_2CH_2OCH_2CH_2OOCCH_2\quad H$ |

EXAMPLES 16 TO 43

Ten parts of monomer mixture of equimolar amounts of novel $R_f$-monomers and comonomers as listed in Table 2; 0.05 part of azobisisobutyronitrile and ten parts of hexafluoroxylene were sealed in an ampul under nitrogen and polymerized for 16 hours at 70° C. The resulting polymer solutions were diluted with 30 parts of hexafluoroxylene and added dropwise into 800 parts of methanol under vigorous stirring. The precipitated copolymers were separated from the solvent-nonsolvent mixture and dried under high vacuum at room temperature for 48 hours. Yields, appearance and analysis of the novel copolymers are listed in Table 2.

TABLE 2

| Ex. No. | Monomer Ex. No. | Composition of monomer mixture (Equimolar ratio of $R_f$-monomer to comonomer) | | Appearance of copolymer | Yield, after ppt. | Elemental analyses, percent | | | | | |
|---|---|---|---|---|---|---|---|---|---|---|---|
| | | | | | | Calculated | | | Found | | |
| | | $R_f$-Monomer | Comonomer | | | C | H | F | C | H | F |
| 16 | 1 | $\left[=CHCOOCH_2CH_2CF_2CF_2OCF(CF_3)_2\right]_2$ | $CH_2=CHO(CH_2)_4OH$ HBVE | Colorless, soft. | 65.28 | 33.66 | 2.59 | 48.81 | 32.67 | 2.44 | 46.47 |
| 17 | 1 | As above | $CH_2=CHOCH_3$ MVE | Colorless, soft, rubbery. | 98.09 | 31.59 | 2.02 | 52.36 | 31.54 | 1.90 | 52.56 |
| 18 | 1 | do | $CH_2=CHOOCCH_3$ VA | Soft, tacky | 82.88 | 31.97 | 1.95 | 50.58 | 31.54 | 1.90 | 52.02 |
| 19 | 1 | do | $CH_2=CHC_6H_5$ STY | Flexible, tough. | 86.80 | 36.98 | 2.15 | 49.52 | 37.54 | 2.22 | 47.48 |
| 20 | 2 | $\left[=CHCOOCH_2CH_2CH=CHC_7F_{15}\right]_2$ | HBVE | Soft, colorless. | 93.5 | 38.45 | 2.33 | 50.09 | | | 51.18 |
| 21 | 2 | As above | MVE | Soft, tacky | 99.43 | 34.20 | 1.97 | 55.96 | 34.10 | 1.91 | 54.98 |
| 22 | 2 | do | STY | Flexible, tough. | 84.02 | 38.36 | 2.08 | 53.55 | 38.64 | 2.06 | 52.72 |
| 23 | 3 | $CH_2=CCOOCH_2CH_2CH=CHC_7F_{15}$<br>$CH_2COOCH_2CH_2CH=CHC_7F_{15}$ | HBVE | Soft, colorless. | 87.1 | 36.34 | 2.59 | 52.20 | 35.41 | 2.12 | 54.56 |

TABLE 2—Continued

| Ex. No. | Monomer Ex. No. | Composition of monomer mixture (Equimolar ratio of $R_f$—monomer to comonomer) | | Appearance of copolymer | Yield, after ppt. | Elemental analyses, percent | | | | | |
|---|---|---|---|---|---|---|---|---|---|---|---|
| | | | | | | Calculated | | | Found | | |
| | | $R_f$-Monomer | Comonomer | | | C | H | F | C | H | F |
| 24 | 3 | Same as Example 23 | MVE | Soft, colorless. | 68.94 | 34.90 | 2.15 | 55.21 | 34.37 | 2.06 | 56.25 |
| 25 | 3 | ...do... | STY | Tough, brittle. | 85.85 | 38.97 | 2.24 | 52.85 | 39.80 | 2.39 | 50.65 |
| 26 | 4 | $=\!\!\begin{bmatrix}\text{CHCOOCH}_2\text{CH}_2\text{CH}=\text{CHC}_4\text{F}_9\end{bmatrix}_2$ | HBVE | Soft, colorless. | 93.5 | 40.22 | 3.58 | 44.05 | 40.47 | 3.32 | 45.09 |
| 27 | 4 | As above | MVE | Soft, tough polymer. | 91.31 | 38.45 | 2.80 | 47.60 | 38.77 | 2.80 | 48.31 |
| 28 | 5 | $=\!\!\begin{bmatrix}\text{CHCOO(CH}_2)_6\text{CH}=\text{CHC}_7\text{F}_{15}\end{bmatrix}_2$ | HBVE | Soft, colorless. | 87.4 | 43.40 | 4.28 | 44.78 | 43.19 | 4.17 | 46.15 |
| 29 | 5 | As above | MVE | Very soft | 92.37 | 42.51 | 3.98 | 46.92 | 42.90 | 3.98 | 46.91 |
| 30 | 5 | ...do... | STY | Tacky, viscous. | 73.85 | 45.72 | 4.00 | 45.21 | 45.98 | 4.04 | 45.42 |
| 31 | 6 | $=\!\!\begin{bmatrix}\text{CHCOO(CH}_2)_6\text{CH}=\text{CHCF(CF}_3)_2\end{bmatrix}_2$ | HBVE | Viscous oil | 78.4 | 52.29 | 6.24 | 30.48 | 52.02 | 6.02 | 32.77 |
| 32 | 6 | As above | MVE | Colorless, high viscous. | 83.61 | 51.59 | 5.94 | 32.65 | 53.89 | 6.34 | 32.75 |
| 33 | 7 | $=\!\!\begin{bmatrix}\text{CHCOOCH}_2\text{CH}_2\text{OCH}_2\text{CH}=\text{CHC}_7\text{F}_{15}\end{bmatrix}_2$ | HBVE | Soft, colorless. | 92.5 | 35.93 | 2.67 | 50.15 | 35.28 | 2.49 | 51.92 |
| 34 | 7 | As above | MVE | ...do... | 95.83 | 34.52 | 2.24 | 52.85 | 34.38 | 2.31 | 53.25 |
| 35 | 7 | ...do... | STY | Soft, tough polymer. | 82.57 | 34.52 | 2.24 | 52.85 | 23.38 | 2.31 | 53.25 |
| 36 | 8 | $\text{CH}_2=\text{CCOCH}_2\text{CH}_2\text{OCH}_2\text{CH}=\text{CHC}_7\text{F}_{15}$ <br> $\dot{\text{C}}\text{H}_2\text{COOCH}_2\text{CH}_2\text{OCH}_2\text{CH}=\text{CHC}_7\text{F}_{15}$ | HBVE | Soft, tacky | 72.5 | 36.53 | 2.80 | 49.52 | | | 50.02 |
| 37 | 8 | As above | MVE | Soft, colorless. | 56.86 | 35.18 | 2.40 | 52.17 | 34.13 | 2.13 | 52.42 |
| 38 | 9 | $=\!\!\begin{bmatrix}\text{CHCOOCH}_2\text{CH}_2\text{O(CH}_2)_3\text{C}_7\text{F}_{15}\end{bmatrix}_2$ | HBVE | ...do... | 88.3 | 35.80 | 3.00 | 49.97 | 34.56 | 2.67 | 50.75 |
| 39 | 9 | As above | MVE | Soft, tacky polymer. | 93.84 | 34.39 | 2.60 | 52.65 | 23.01 | 2.63 | 53.38 |
| 40 | 9 | ...do... | STY | Soft, tough polymer. | 83.43 | 38.31 | 2.68 | 50.51 | 38.89 | 2.82 | 49.91 |
| 41 | 10 | $\text{CH}_2=\text{CHCOOCH}_2\text{CH}_2\text{OCH}_2\text{CH}_2\text{CH}_2\text{C}_7\text{F}_{15}$ <br> $\dot{\text{C}}\text{H}_2\text{COOCH}_2\text{CH}_2\text{OCH}_2\text{CH}_2\text{CH}_2\text{C}_7\text{F}_{15}$ | HBVE | Soft, colorless. | 82.5 | 36.41 | 3.14 | 49.37 | 35.62 | 2.97 | 50.94 |
| 42 | 10 | As above | MVE | ...do... | 70.92 | 35.05 | 2.76 | 51.98 | 35.19 | 2.65 | 52.24 |
| 43 | 10 | ...do... | STY | Soft, tough | 84.54 | 38.89 | 2.82 | 49.88 | 40.89 | 2.35 | 48.91 |

EXAMPLES 44 AND 45

Ten parts of monomers Example 2 or 7 and 0.025 part of benzoyl peroxide were sealed in an ampul under nitrogen and polymerized for 16 hours at 80° in a constant temperature oil bath. The resulting polymer was dissolved in ten parts of hexafluoroxylene and then precipitated into 200 parts of hexane under vigorous stirring. The homopolymers which precipitated as very viscous oils were separated from the hexane layer and dried at room temperature under high vacuum for 48 hours. IR analysis conformed the disappearance of the fumarate double bonds in both examples. The following yields and elemental analysis were obtained:

Example 44 (monomer 2).—Yield, 81%.
*Elemental analysis.*—Calc. (percent): C, 32.51; H, 1.47; F, 59.93. Found (percent): C, 32.28; H, 1.42; F, 59.51.

Example 45 (monomer 7).—Yield, 78%.
*Elemental analysis.*—Calc. (percent): C, 32.96; H, 1.78; F, 55.86. Found (percent): C, 32.83; H, 1.68; F, 56.32.

EXAMPLE 46

Employing the polymerization procedure described for Examples 16 to 43, alternating copolymers of the novel $R_f$-monomers Examples 11 through 15 and the following comonomers are prepared:

methyl vinyl ether
ethyl vinyl ether
butyl vinyl ether
4-hydroxybutyl vinyl ether
2-methoxyethyl vinyl ether
vinyl acetate
vinyl benzoate
styrene
p-chlorostyrene
p-methoxystyrene
isobutylene.

EXAMPLES 47–59

Polymer examples as listed in Table 3 were dissolved in hexafluoroxylene or Freon 113 and polymer films prepared by placing a few drops of the polymer solutions on a glass slide and with a clean edge spreading the solution over the surface of the slide. Instantaneous solvent evaporation left the polymer as a smooth film. Contact angles of octane to tetradecane on the polymer films were measured using a Visco-Tech contact angle analyzer. From the contact angle data the critical surface tension $\nu c$ was determined according to the following reference: W. Zisman, Contact Angles, Advances in Chemistry, No. 43, ACS Publications, Washington, D.C., 1964.

$\nu c$ data obtained are listed in Table 3.

TABLE 3

| Example number | Polymer Ex. No. | Composition of alternating 1:1 copolymers | | γc (dynes/cm.) |
|---|---|---|---|---|
| | | $R_f$-monomer | Comonomer | |
| 47 | 17 | Fumarate of $(CF_3)_2CFOCF_2CF_2CH_2CH_2OH$ | $CH_2=CHOCH_3$ | 13.6 |
| 48 | 21 | Fumarate of $C_7F_{15}CH=CHCH_2CH_2OH$ | As above | 14.1 |
| 49 | 22 | ...do... | $CH_2=CHC_6H_5$ | 13.4 |
| 50 | 24 | Itaconate of $C_7F_{15}CH=CHCH_2CH_2OH$ | $CH_2=CHOCH_3$ | 12.1 |
| 51 | 27 | Fumarate of $C_6F_9CH=CHCH_2CH_2OH$ | As above | 15.9 |
| 52 | 29 | Fumarate of $C_7F_{15}CH=CH(CH_2)_9OH$ | ...do... | 17.2 |
| 53 | 32 | Fumarate of $(CF_3)_2CFCH=CH(CH_2)_9OH$ | ...do... | 20.0 |
| 54 | 34 | Fumarate of $C_7F_{15}CH=CHCH_2OCH_2CH_2OH$ | ...do... | 13.1 |
| 55 | 35 | ...do... | $CH_2=CHC_6H_5$ | 13.4 |
| 56 | 37 | Itaconate of $C_7F_{15}CH=CHCH_2OCH_2CH_2OH$ | $CH_2=CHOCH_3$ | 12.1 |
| 57 | 39 | Fumarate of $C_7F_{15}(CH_2)_2OCH_2CH_2OH$ | As above | 15.8 |
| 58 | 40 | ...do... | $CH_2=CHC_6H_5$ | 13.2 |
| 59 | 42 | Itaconate of $C_7F_{15}(CH_2)_2OCH_2CH_2OH$ | $CH_2=CHOCH_3$ | 14.4 |

EXAMPLES 60 TO 82

Homo and copolymers as listed in Tables 4 and 5 were dissolved in hexafluoroxylene so that solutions with a 2% solid content were obtained. These polymer solutions were further diluted with methyl chloroform and applied alone or in combination with a poly isobutyl methacrylate extender to a polyester-cotton (65/35) fabric by padding in such a way that 0.2% fluorine was deposited onto the test fabric. After drying the test fabric at 150° C. for 3 minutes, oil repellencies (AATCC and 3–M Oil Test) and water repellencies (AATCC) were determined and data obtained as listed in Table 4 and 5.

$R_fA$ is

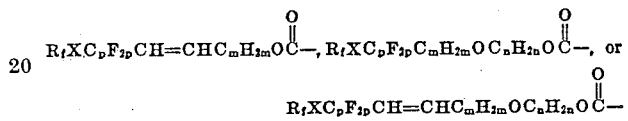

$R_f$ is $C_qF_{2q+1}$;
$q$ is 6 to 12;
$m$ is 2 to 4;
$n$ is 2 to 4;

TABLE 4

| Ex. No. | Polymer Ex. No. | Copolymers of $R_f$-monomers and comonomers (equimolar ratios) | | Repellency with 0.2% fluorine on PE | | | |
|---|---|---|---|---|---|---|---|
| | | | | AATCC/3-M oil | | AATCC water | |
| | | $R_f$-monomer | Comonomer[1] | No extender | Extended[2] | No extender | Extended[2] |
| 60 | 16 | Fumarate of $(CF_3)_2CFOCF_2CF_2CH_2CH_2OH$ | HBVE | 5 | 4 | 70 | 70 |
| 61 | 17 | ...do... | MVE | 3 | 3 | 70 | 70 |
| 62 | 18 | ...do... | VA | 4 | 3 | 70–80 | 70 |
| 63 | 19 | ...do... | STY | 3 | 3 | 70 | 70–80 |
| 64 | 20 | Fumarate of $C_7F_{15}CH=CHCH_2CH_2OH$ | HBVE | 4 | 4 | 70 | 70 |
| 65 | 21 | ...do... | MVE | 4 | 4 | 70 | 70–80 |
| 66 | 22 | ...do... | STY | 4 | 4 | 70 | 70–80 |
| 67 | 23 | Itaconate of $C_7F_{15}CH=CHCH_2CH_2OH$ | HBVE | 2 | 3 | 70 | 70 |
| 68 | 24 | ...do... | MVE | 2 | 2 | 70 | 70 |
| 69 | 25 | ...do... | STY | 2 | 3 | 70 | 70–80 |
| 70 | 33 | Fumarate of $C_7F_{15}CH=CHCH_2OCH_2CH_2OH$ | HBVE | 4 | 4 | 70 | 70 |
| 71 | 34 | ...do... | MVE | 3 | 3 | 70–80 | 70 |
| 72 | 35 | ...do... | STY | 3–4 | 4 | 70 | 70–80 |
| 73 | 36 | Itaconate of $C_7F_{15}CH=CHCH_2OCH_2CH_2OH$ | HBVE | 3 | 3 | 70–80 | 70–80 |
| 74 | 37 | ...do... | MVE | 2 | 2 | 70 | 70 |
| 75 | 38 | Fumarate of $C_7F_{15}CH_2CH_2CH_2OCH_2CH_2OH$ | HBVE | 4 | 4 | 70 | 70 |
| 76 | 39 | ...do... | MVE | 3 | 3 | 70–80 | 70–80 |
| 77 | 40 | ...do... | STY | 3–4 | 4 | 70 | 70–80 |
| 78 | 41 | Itaconate of $C_7F_{15}CH_2CH_2CH_2OCH_2CH_2OH$ | HBVE | 2 | 3 | 70 | 70 |
| 79 | 42 | ...do... | MVE | 2 | 2 | 70 | 70 |
| 80 | 43 | ...do... | STY | 3 | 3–4 | 70–80 | 70–80 |

[1] HBVE=Hydroxy butyl vinyl ether; MVE=Methyl vinyl ether; VA=Vinyl acetate; STY=styrene.
[2] Extended with polyisobutyl methacrylate to 20% fluorine in total solids.

TABLE 5

| Example number | Polymer Ex. No. | Homopolymer (oligomer) of— | Repellency with 0.2% fluorine on PE | | | |
|---|---|---|---|---|---|---|
| | | | AATCC/3 M oil | | AATCC water | |
| | | | No extender | Extended[1] | No extender | Extended[1] |
| 81 | 44 | Fumarate of $C_7F_{15}CH=CHCH_2CH_2OH$ | 3 | 3 | 70–80 | 70–80 |
| 82 | 45 | Fumarate of $C_7F_{15}CH=CHCH_2OCH_2CH_2OH$ | 3 | 3 | 70 | 70–80 |

[1] Extended as in Table 4.

What is claimed is:

1. A compound of the formula:

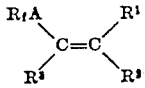

wherein
$R^1$, $R^2$, $R^3$ are hydrogen, methyl, $R_fA$ or $R_fACH_2$— with the proviso that at least one of $R^1$, $R^2$, $R^3$ represent $R_fA$ or $R_fACH_2$—;

$p$ is 2 to 6 or zero; and
X is oxygen or zero if $p$ is zero.

2. A compound of the formula:

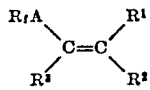

wherein
$R^1$, $R^2$, $R^3$ are hydrogen, methyl, $R_fA$ or $R_fACH_2$— with the proviso that at least one of $R^1$, $R^2$, $R^3$ represent $R_fA$ or $R_fACH_2$—;

$R_fA$ is

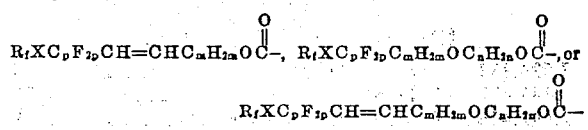

$R_f$ is $C_qF_{2q+1}$;
$q$ is 3 to 18;
$m$ is 1 to 12;
$n$ is 2 to 12;
$p$ is 2 to 6 or zero; and
$X$ is oxygen.

3. A compound of the formula:

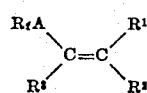

wherein
$R^1$, $R^2$, $R^3$ are hydrogen, methyl, $R_fA$ or $R_fACH_2$— with the proviso that at least one of $R^1$, $R^2$, $R^3$ represent $R_fA$ or $R_fACH_2$—;
$R_f$ is

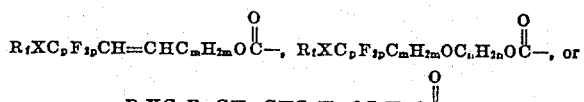

$R_f$ is $C_qF_{2q+1}$;
$q$ is 3 to 18;
$m$ is 1 to 12;
$n$ is 2 to 12;
$p$ is zero; and
$X$ is zero.

4. A compound of the formula:

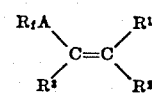

wherein
$R^1$ and $R^2$ are hydrogen, $R^3$ is $R_fACH_2$—;
$R_fA$ is

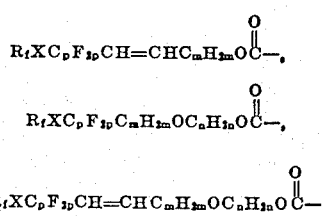

$R_f$ is $C_qF_{2q+1}$;
$q$ is 6 to 12;
$m$ is 2 to 4;
$n$ is 2 to 4;
$p$ is 2 to 6 or zero; and
$X$ is oxygen or zero if $p$ is zero.

5. The compound of claim 1 wherein $R^1$ and $R^3$ are hydrogen and $R^2$ is $R_fA$—.
6. The compound of claim 4 wherein $n$ is 2–4 and $m$ is 2–4.
7. The compound of claim 5 wherein $X$ is oxygen.
8. The compound of claim 6 wherein $X$ is oxygen.
9. The compound of claim 5 wherein $p$ is zero and $X$ is zero.
10. The compound of claim 6 wherein $p$ is zero and $X$ is zero.
11. Hompolymers having water and oil repellency properties comprising a skeletal chain with repeating units of the formula:

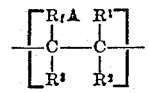

wherein
$R^1$, $R^2$, $R^3$ are hydrogen, methyl, $R_fA$ or $R_fACH_2$— with the proviso that at least one of $R^1$, $R^2$, $R^3$ represent $R_fA$ or $R_fACH_2$—;
$R_fA$ is

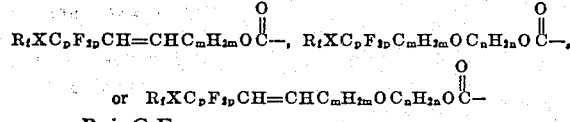

$R_f$ is $C_qF_{2q+1}$;
$q$ is 6–12;
$m$ is 2–4;
$n$ is 2–4;
$p$ is 6 or zero;
$X$ is oxygen if $p$ is zero.

12. Homopolymers having water and oil repellency properties comprising a skeletal chain with repeating units of the formula:

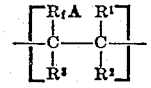

wherein
$R^1$, $R^2$, $R^3$ are hydrogen, methyl, $R_fA$ or $R_fACH_2$— with the proviso that at least one of $R^1$, $R^2$, $R^3$ represent $R_fA$ or $R_fACH_2$—;
$R_fA$ is

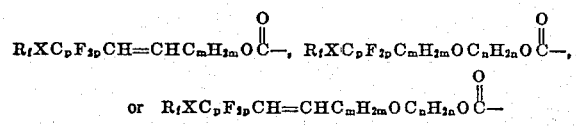

$R_f$ is $C_qF_{2q+1}$;
$q$ is 3 to 18;
$m$ is 1 to 12;
$n$ is 2 to 12;
$p$ is 2 to 6 or zero; and
$X$ is oxygen.

13. Homopolymers having water and oil repellency properties comprising a skeletal chain with repeating units of the formula:

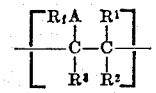

wherein
$R^1$, $R^2$, $R^3$ are hydrogen, methyl, $R_fA$ or $R_fACH_2$— with the proviso that at least one of $R^1$, $R^2$, $R^3$ represents $R_fA$ or $R_fACH_2$—;
$R_fA$ is

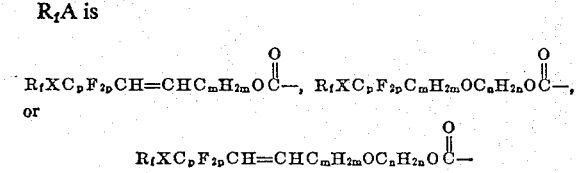

$R_f$ is $C_qF_{2q+1}$;
$q$ is 3 to 18;
$m$ is 1 to 12;
$n$ is 2 to 12;
$p$ is zero;
$X$ is zero.

14. The homopolymer of claim 11 wherein $R^1$ and $R^3$ are hydrogen and $R^2$ is $R_fA$.
15. The homopolymer of claim 11 wherein $R^1$ and $R^2$ are hydrogen and $R^3$ is $R_fACH_2$—.

16. The homopolymer of claim 14 wherein X is oxygen.

17. The homopolymer of claim 15 wherein X is oxygen.

18. The homopolymer of claim 14 wherein $p$ is zero and X is zero.

19. The homopolymer of claim 15 wherein $p$ is zero and X is zero.

20. Copolymers of ethylenically unsaturated monomers and the monomers of claim 1 having water and oil repellency properties.

21. Copolymers of ethylenically unsaturated monomers and the monomers of claim 2 having water and oil repellency properties.

22. Copolymers of ethylenically unsaturated monomers and the monomers of claim 3 having water and oil repellency properties.

23. A solid substrate containing a coating of the homopolymer of claim 11.

24. The coated substrate of claim 23 which includes a textile.

25. A solid substrate containing a coating of the homopolymer of claim 12.

26. A solid substrate containing a coating of the homopolymer of claim 13.

References Cited

UNITED STATES PATENTS

| | | | |
|---|---|---|---|
| 3,594,353 | 7/1971 | Domba | 260—78.4 |
| 3,385,882 | 5/1968 | Tullio | 260—485 |
| 2,642,416 | 6/1953 | Ahlbrecht et al. | 260—83.5 |
| 3,102,103 | 8/1963 | Ahlbrecht et al. | 260—29.6 |
| 3,172,910 | 3/1965 | Brace | 260—539 |
| 3,219,687 | 11/1965 | Zisman | 260—485 |
| 2,841,573 | 7/1957 | Ahlbrecht et al. | 260—79.3 |

JOSEPH L. SCHOFER, Primary Examiner

J. KIGHT III, Assistant Examiner

U.S. Cl. X.R.

117—132 CF, 161 UC, UB; 260—78.5 B, E, 79.7, 455 R, 485 F